United States Patent [19]

Yoshiji et al.

[11] Patent Number: 5,079,829
[45] Date of Patent: Jan. 14, 1992

[54] AUTOMATIC ASSEMBLY APPARATUS

[75] Inventors: Takeo Yoshiji; Yutaka Sato; Teruo Yoshioka, all of Sayama, Japan

[73] Assignee: Honda Giken Kogyo Kabushiki Kaisha, Tokyo, Japan

[21] Appl. No.: 497,361

[22] Filed: Mar. 22, 1990

[30] Foreign Application Priority Data

Mar. 24, 1989 [JP] Japan .................... 1-72189

[51] Int. Cl.$^5$ ...................... B23P 19/04; B23Q 3/155
[52] U.S. Cl. ...................... 29/568; 29/563; 29/784; 29/799
[58] Field of Search ............. 29/784, 786, 799, 235, 29/568, 563, 33 P

[56] References Cited

U.S. PATENT DOCUMENTS

| | | | |
|---|---|---|---|
| 3,239,925 | 3/1966 | Piper | 29/784 X |
| 4,787,141 | 11/1988 | Miyazaki et al. | 29/784 X |
| 4,809,425 | 3/1989 | Monforte | 29/568 |

Primary Examiner—Z. R. Bilinsky
Attorney, Agent, or Firm—Armstrong, Nikaido, Marmelstein, Kubovcik & Murray

[57] ABSTRACT

An apparatus having a robot on an frame having in front thereof a jig base for positioning thereon workpieces to which parts are to be assembled. The robot supports an assembling head equipped with a parts-holding member movable in a longitudinal and a vertical direction towards and away from the jig base so that the parts can be picked up out of a parts-containing pallet supplied at a predetermined pickup position on the frame and assembled to the workpiece positioned on the jig base. A pair of front and rear pallet chambers are formed in a space under the frame such that parts-containing pallets can be brought in and taken out in a stacked condition, one of the chambers being used as a feeding pallet chamber and the other as a discharging pallet chamber. A pallet conveying apparatus is provided to lift the parts-containing pallets fed to the feeding pallet chamber to an upper position of the chamber successively from the uppermost one, transport them from the upper position to an upper position of the discharging pallet chamber, and then lower them into the discharging pallet chamber. The parts inside the parts-containing pallets are picked up by the assembling head with the pallets stopped in the pickup position which is set at the upper position of the front side pallet chamber.

3 Claims, 8 Drawing Sheets

AUTOMATIC ASSEMBLY APPARATUS

BACKGROUND OF THE INVENTION

This invention relates to an automatic assembly apparatus for assembling parts to workpieces.

An apparatus is known in which a robot apparatus is mounted on a frame. A jig base for positioning thereon workpieces is set in front of the frame. The robot apparatus supports an assembling head equipped with a parts-holding member movable in a longitudinal direction towards and away from the jig base as well as in a vertical direction so that the parts can be picked up by the assembling head out of parts-containing pallets to be supplied to a predetermined pickup position on the frame and are automatically assembled to the workpieces. In this case, it is normal practice to convey the parts-containing pallets via a conveyor provided in communication with the apparatus at the rear or side of the frame.

In the above-mentioned apparatus there is a problem in that the entire apparatus becomes large since the conveyor for the pallets must be provided.

SUMMARY OF THE INVENTION

A first object of this invention is to utilize the space under the frame as a space for feeding the parts-containing pallets, thereby trying to make the assembly apparatus more compact.

Further, a second object thereof is to provide a compact assembly apparatus by utilizing the space under the frame also as a stock space for the assembling heads in order to cop with the changing of heads in connection with the change in the kind of workpieces.

In order to solve the above-mentioned first object, the invention includes an automatic assembly apparatus having a robot apparatus on a frame, the frame having, a jig base provided in front of the frame for positioning thereon workpieces to which parts are assembled, the robot supporting an assembling head equipped with a parts-holding member movable in a longitudinal direction towards and away from the jig base as well as in a vertical direction so that the parts can be picked up by the assembling head out of a parts-containing pallet to be supplied to a predetermined pickup position on the frame and can be assembled to the workpieces positioned on the jig base. A pair of front and rear pallet chambers are formed in a space under the frame such that parts containing pallets can be brought in and taken out in a stacked condition, one of the chambers being used as a feeding pallet chamber and the other as a discharging pallet chamber. A pallet conveying apparatus is provided such that the parts-containing pallets fed to the feeding pallet chamber in a stacked condition are lifted to an upper position of the feeding pallet chamber successively from the uppermost one and that the pallets are transported from the upper position to an upper position of the discharging pallet chamber and then lowered into the discharging pallet chamber. The parts inside the parts-containing pallets are picked up by the assembling head with the pallets stopped in the pickup position which is set at the upper position of the front side pallet chamber.

Further, in the invention, in order to attain the above-mentioned second object, a stock chamber is formed in a space under the frame between both pallet chambers, the stock chamber containing therein a head magazine in which a plurality of assembling heads can be placed. The assembling heads are made to be interchangeable between the robot apparatus and the head magazine.

In this case, it is preferable to make the head magazine to be freely insertable into and withdrawable from the stock chamber.

Further, if two kinds of parts are assembled to the workpieces, the automatic assembly apparatus has a second assembling head for assembling second parts which is different from the above-mentioned assembling head and the above-mentioned parts. The second assembling head is provided on the robot apparatus side by side with the assembling head in the longitudinal direction. The frame is extended in a lateral direction. A pair of front and rear second pallet chambers are formed in a space under the extended portion of the frame such that second-parts-containing pallets for the second parts can be brought in and taken out in a stacked condition, one of the second pallet chambers being used as a feeding pallet chamber and the other as a discharging pallet chamber. A second pallet conveying apparatus is provided such that the second parts-containing pallets fed to the second feeding pallet chamber in a stacked condition are lifted up to an upper position of the second feeding pallet chamber successively from the uppermost one and that the pallets are transported from the upper position to an upper position in the second discharging pallet chamber and then lowered into the second discharging pallet chamber. A receiving unit is provided in a front portion of the frame so as to be movable between a parts-feeding position in front of the pickup position and a parts-receiving position at the lateral side thereof. A transfer apparatus is provided for transferring the second parts placed in the second-parts-containing pallet which is positioned in the upper position of the front pallet chamber to the receiving unit which is positioned in the parts-receiving position. The second parts are made to be received by the second assembling head in a condition in which the receiving unit has been moved to the parts-feeding position.

Parts in a parts-containing pallet which is positioned in the pickup position are picked up by the assembling head and are assembled to a workpiece positioned on the jig base. When the parts-containing pallet has become empty by repeating the above-mentioned work, the empty pallet is lowered, (when the front-side pallet chamber is a discharging pallet chamber) into the discharging pallet chamber and the next parts-containing pallet is conveyed from the upper position of the feeding pallet chamber. When the front-side pallet chamber is a feeding pallet chamber, the empty pallet is conveyed to the upper position of the discharging pallet chamber and is lowered into the discharging pallet chamber and, at the same time, the next parts-containing pallet is lifted to the pickup position from the feeding pallet chamber. In this manner, whenever a pallet becomes empty, the next parts-containing pallet is fed to the pickup position in order to continuously perform the assembling work. Stacked parts-containing pallets are fed by an operator to the feeding pallet chamber as required, and the empty parts-containing pallets which get stocked in a stacked condition by their lowering into the discharging pallet chamber are discharged from the discharging pallet chamber.

Further according to the invention, second parts-containing pallets are successively fed to the upper position of the front pallet chamber of a pair of second pallet chambers in the same manner as the above case. The second parts in the pallets are fed to the parts-feeding position in front of the pickup position via the transporting apparatus and the receiving unit. The second parts are made to be received by the second assembling head, thereby enabling assembly of two kinds of parts to the workpieces by the second assembling head and the first assembling head.

In changing the kind of workpieces, the assembling head is moved by the robot apparatus to an upper position of the stock chamber, the assembling head is placed to a predetermined position of the head magazine, and the robot apparatus receives the assembling head for the next kind of workpieces thereby performing the interchanging of the assembling heads.

In this case, it may also be possible to arrange a pair of pallet chambers in the longitudinal direction of the frame in close proximity to each other, and to arrange a stock chamber at the rear of these pallet chambers. However, in such an arrangement, the assembling head has to be moved largely backwards during the exchanging, resulting in a prolonged reciprocating stroke of the assembling head and in an enlarged robot apparatus. In contrast, if the stock chamber is arranged between the pair of pallet chambers as in the present invention, the reciprocating stroke of the assembling head remains short, and the robot can be made smaller.

If the stock chamber is arranged in this manner, it sometimes becomes impossible to form the stock chamber long in the longitudinal direction (in order to prevent the apparatus from becoming large) and it is, consequently, impossible to place a sufficient number of assembling heads in the head magazine. But if the head magazine is made to be freely insertable into and withdrawable from the stock chamber as in the present invention, it is advantageous in that many kinds of heads are made available in interchanging by preparing a plurality of head magazines.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 9:
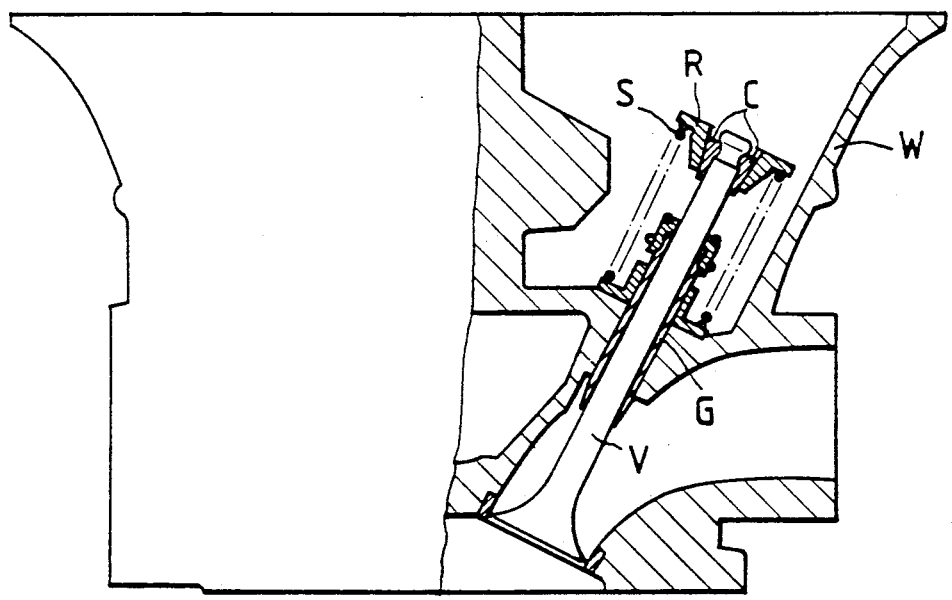
FIG. 9 is a side view, half shown in section, of a cylinder head for explaining an assembling condition of parts.

The drawings show an embodiment of this invention as applied to an automatic assembly apparatus in which a valve spring S is assembled to a cylinder head W, which is a workpiece, of an engine in such a manner as to externally enclose a valve guide G which is inserted into position in the cylinder head and, at the same time, a retainer R is assembled to an end of a valve V which has been inserted in advance through the valve guide G with a cotter C to prevent its coming out of position, as shown in FIG. 9.

Figure 1:
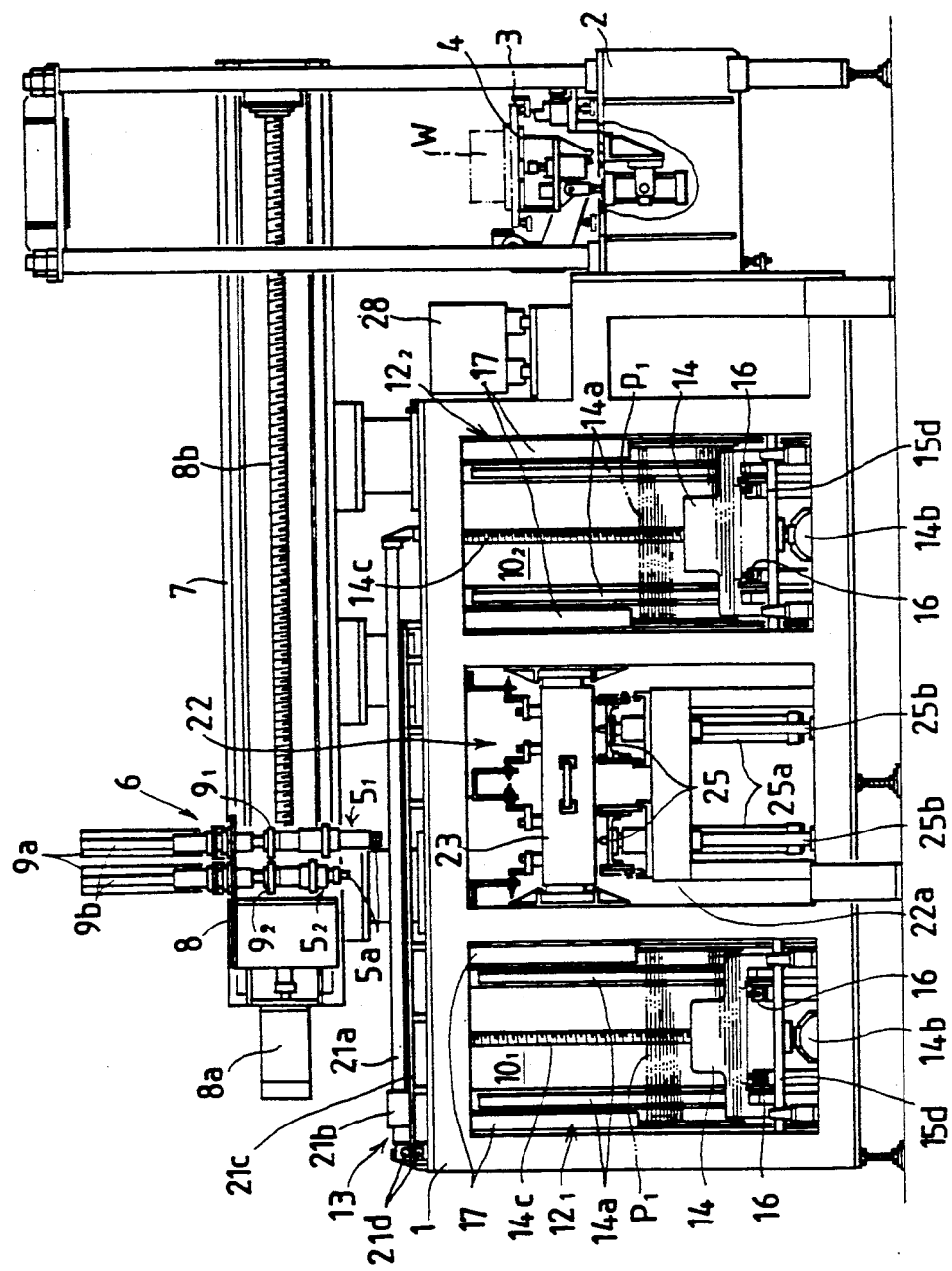
FIG. 1 is a side view of one example of the present inventive apparatus.
Figure 2:
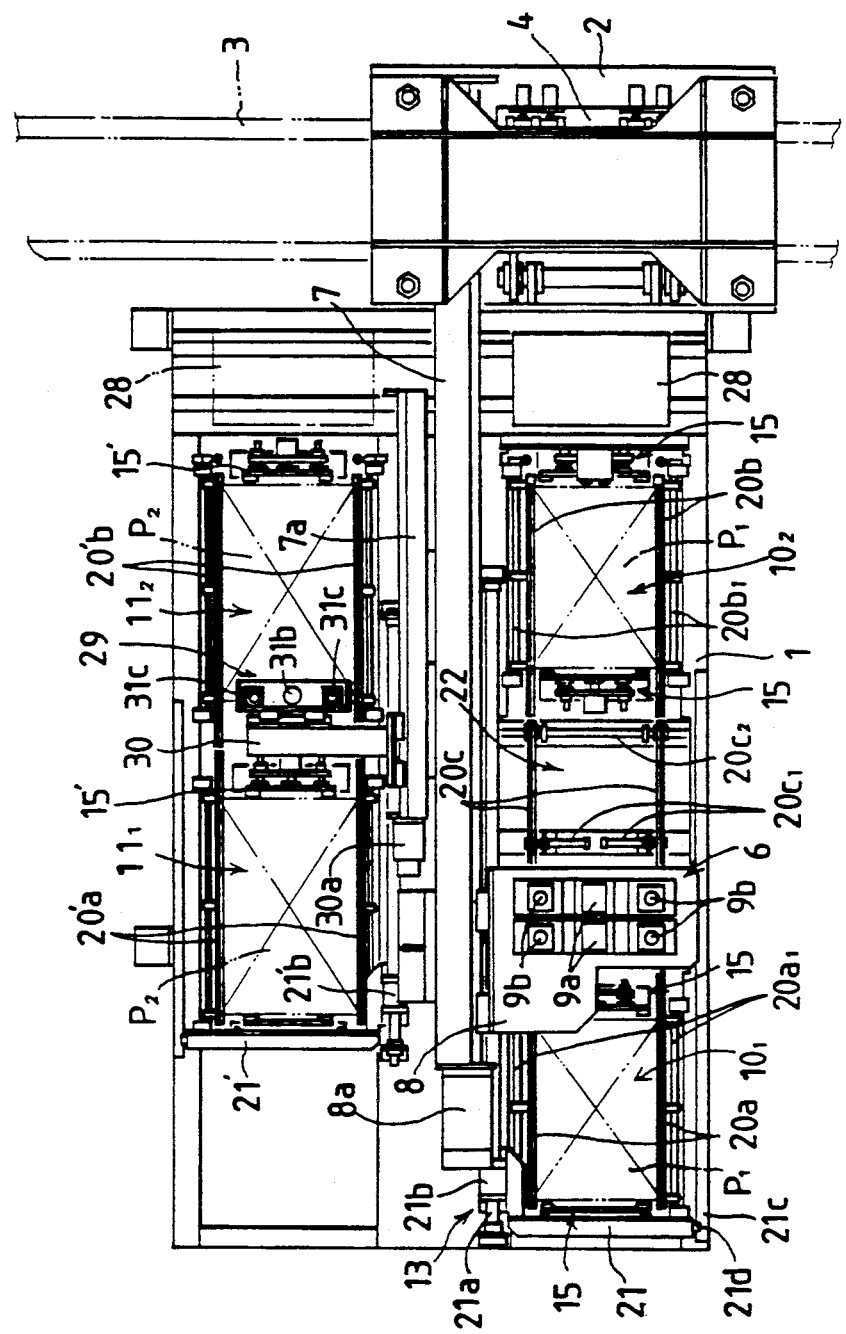
FIG. 2 is a plan view of the apparatus.
Figure 3:
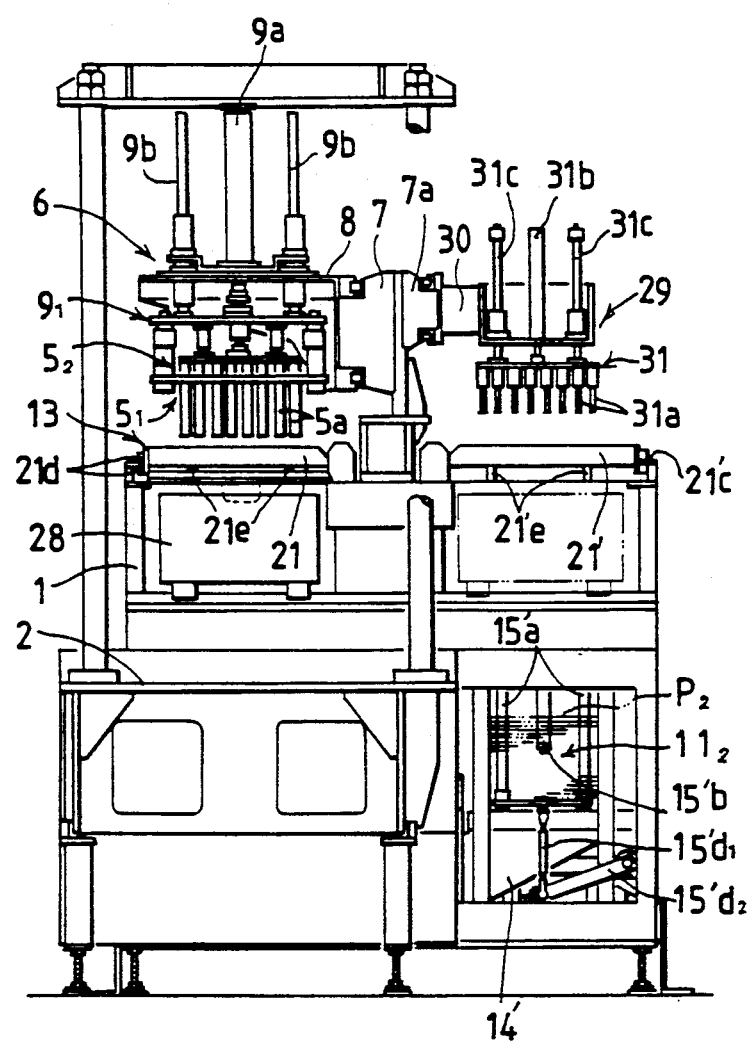
FIG. 3 is a front view of the apparatus with a jig on the jig base omitted.

Referring to FIGS. 1 through 3, an assembly apparatus has a frame 1. A jig base 2 is disposed in front of the frame 1. A transporting conveyor 3 for the cylinder heads W extends across the upper space of the jig base 2. A jig 4 is mounted on the jig base 2 supporting the cylinder head W in a tilting manner conveyed by the conveyor 3 such that the center axis of the valve guide G is aligned vertically. A robot apparatus 6 is mounted on the frame 1 and supports a first assembling head $5_1$ for retainers R and a second assembling head $5_2$ for valve springs S. The assembling heads are moved in the longitudinal direction towards and away from the jig base 2 as well as in the vertical direction.

The frame 1 comprises a main body portion which is elongated in the longitudinal direction and a extended portion which is extended in the lateral direction. In the central portion in the width direction of the frame 1, a guide frame 7 extends in the longitudinal direction towards the jig base 2. The robot apparatus 6 is made up of a cross-axis type of robot comprising a robot main body 8 which moves in a reciprocating manner in the upper space of the main body portion in the longitudinal direction along the guide frame 7, a pair of front and rear tool holders $9_1$, $9_2$ for suspending therefrom the assembling heads $5_1$, $5_2$, the tool holders $9_1$, $9_2$ being disposed respectively in a suspending manner by cylinders 9a and guide bars 9b such that they are movable upwards and downwards. The robot main body 8 is so arranged that it is movable in a reciprocating manner by a motor 8a via ball threads 8b in the direction from the frame 1 towards the jig base 2.

In this example, the engine is a multi-cylinder, multi-valve engine. Each of the assembling heads $5_1$, $5_2$ is formed to extend in the width direction. A plurality of holding members 5a for holding retainers R and valve springs S are mounted on them at the same pitch as the layout in which the valves V are arranged. The construction of these assembling heads $5_1$, $5_2$ is not particularly different from that known in Japanese Published Unexamined Utility Model Application Nos. 11539/1987 and 22029/1987, and therefore further explanation is omitted.

The retainers R are contained in the pallets $P_1$ for containing therein the first parts (hereinafter called "first-parts-containing pallets") in a regular arrangement with the cotters C already assembled thereto. The valve springs S are also similarly contained in the pallets $P_2$ for containing therein the second parts (hereinafter called "second-parts-containing pallets") in a regular arrangement for respectively being fed to the assembly apparatus. A pair of the rear and the front first pallet chambers $10_1$, $10_2$ are formed in the space under the main body portion of the frame 1 such that first-parts-containing pallets $P_1$ can be freely fed or brought into and discharged or withdrawn therefrom in a stacked condition. A pair of rear and front second pallet chambers $11_1$, $11_2$ are formed in the space under the extended portion such that second-parts-containing pallets $P_2$ can be freely fed or brought into and discharged or withdrawn therefrom in a stacked condition. The rear pallet chambers $10_1$, $11_1$ are used for the purpose of feeding and the front chambers $10_2$, $11_2$ are used for the purpose of discharging the pallets. Pallets $P_1$, $P_2$ fed to each of the feeding pallet chambers $10_1$, $11_1$ in a stacked condition are lifted to an upper position of each of the pallet chambers $10_1$, $11_1$ and are conveyed to an upper position of each of the discharging pallet chambers $10_2$, $11_2$ from the uppermost one in succession by each conveying apparatus. After the parts, i.e., retainers R and valve springs S, have been picked up as hereinafter described, from inside each of the pallets $P_1$, $P_2$, the pallets $P_1$, $P_2$ which have become empty are lowered to the discharging pallet chambers $10_2$, $11_2$ and the next pallets $P_1$, $P_2$ are conveyed from the upper position of the feeding pallet chambers $10_1$, $11_1$, to the upper position of the discharging pallet chambers $10_2$, $11_2$.

There is little or no difference between the conveying apparatus for the first-parts-containing pallets $P_1$, and the second-parts-containing pallets $P_2$ and, therefore, the construction is explained in detail hereinbelow with reference to the former conveying apparatus.

Figure 4:
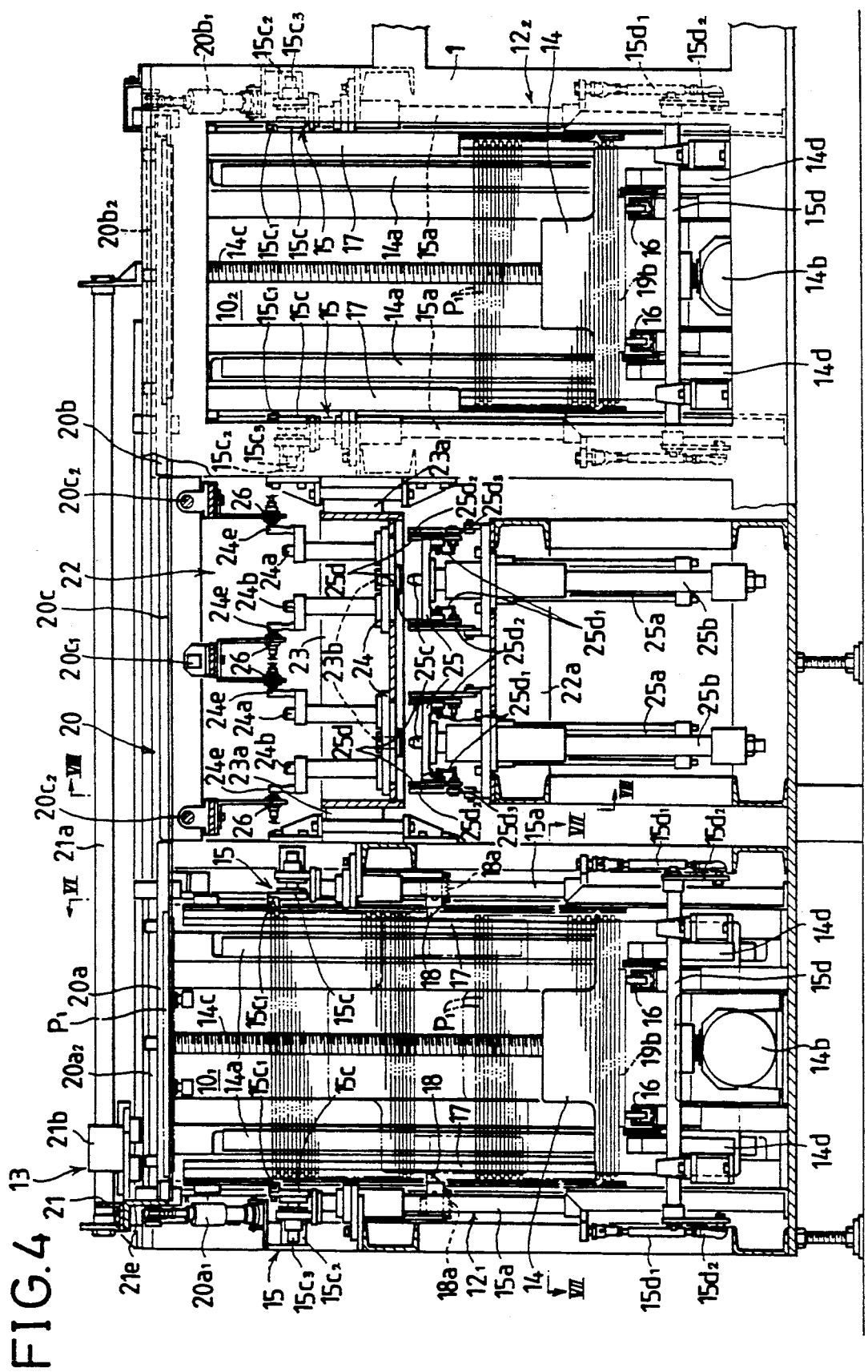
FIG. 4 is a side view, partly in section, of an frame thereof.
Figure 6:
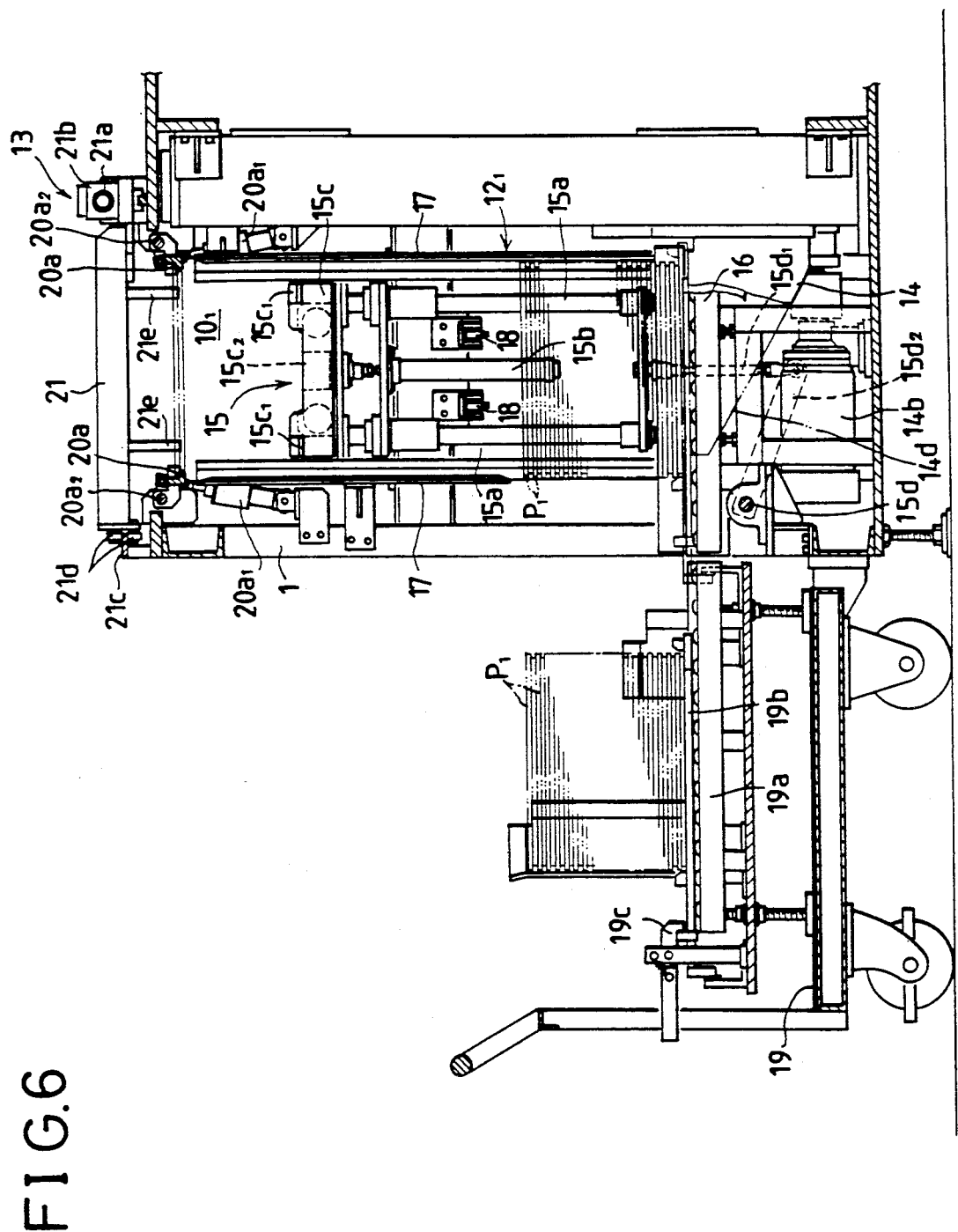
FIGS. 6 through 8 are sectional views taken along the lines VI—VI through VIII—VIII, respectively, of FIG. 4.
Figure 7:
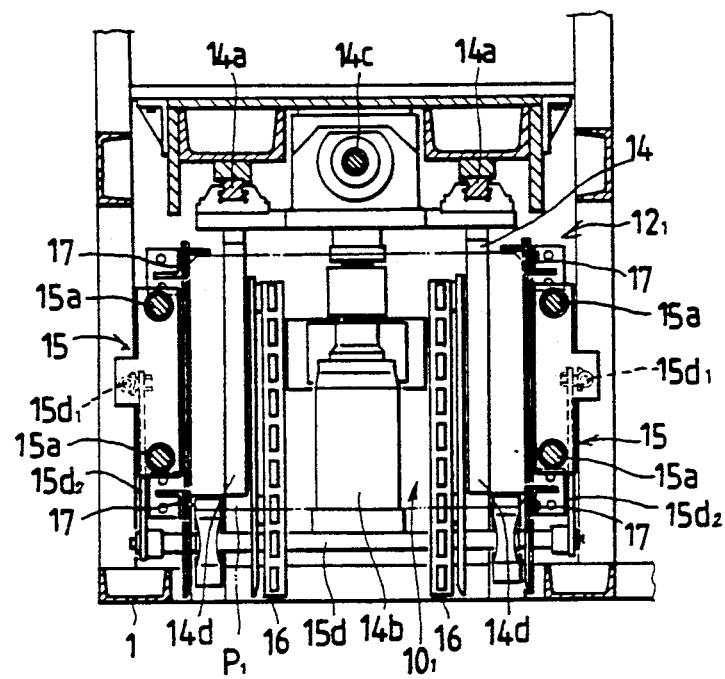

The conveying apparatus comprises a feeding lifter $12_1$ provided in the first feeding pallet chamber $10_1$, a discharging lifter $12_2$ provided in the first discharging pallet chamber $10_2$, and a conveying unit 13 for conveying the first-parts-containing pallets $P_1$ from the upper position of the first feeding pallet chamber $10_1$ to the upper position of the discharging pallet chamber $10_2$. In this embodiment, the feeding lifter $12_1$ is constituted, as shown in FIGS. 4, 6 and 7, by a fork lifter 14 which is supported in a vertically movable manner by guide rails 14a, 14a disposed in an innermost portion of the first feeding pallet chamber $10_1$, and a pair of delivering lifters 15, 15 which are respectively supported in a vertically movable manner via guide bars 15a in the front and the rear sides of an upper portion of the first feeding pallet chamber $10_1$.

The fork lifter 14 is arranged to be vertically movable by a motor 14b disposed at the bottom of the first feeding pallet chamber $10_1$, via a ball thread 14c such that the pallets $P_1$ to be fed in a stacked condition onto those rails 16 with rollers which are positioned at the bottom of the pallet chamber $10_1$, can be supported on a pair of fork portions 14d of the fork lifter 14 and lifted as they are. Members 17 made of angle steel are vertically provided in the pallet chamber $10_1$, and engage the four corners of the pallets $P_1$ to prevent them from being displaced in the longitudinal and the lateral directions during lifting.

The above-mentioned delivering lifters 15, 15 are respectively moved up and down by cylinders 15b. A delivery piece 15c is provided on each delivering lifter 15 and has projected claw portions 15c, which engage with the front and the rear edges of the first-parts-containing pallets $P_1$, such that the delivery pieces 15c can be opened and closed in the longitudinal direction by means of a cylinder $15c_2$ and guide bars $15c_3$. By using a detector (not illustrated) for detecting the lifting of the pallets $P_1$ to a delivering level which is the same level as that of the claw portions 15c, when the lifters 15, 15 are at the lowest position, the fork lifter 14 is intermittently lifted such that the pallets $P_1$, on each stage are sequentially lifted to the delivering level. The pallets $P_1$ lifted to the delivering level are moved upwards to the upper position of the first feeding pallet chamber $10_1$ by closing the delivery pieces 15c and moving the delivering lifters 15, 15 upwards. By repeating this operation, those first-parts-containing pallets $P_1$, which are in a stacked condition are made to be fed sequentially from the uppermost ones to the upper position.

In this embodiment, a synchronizing shaft 15d is rotatably provided at the bottom of the first feeding pallet chamber $10_1$, the synchronizing shaft 15 having levers $15d_2$, $15d_2$ on both ends thereof which are respectively connected through respective links $15d_1$ to the lower ends of the guide bars 15a, 15a of the both feeding lifters 15, 15 so that both of the lifters 15, 15 are synchronously lifted and lowered. Further, pallet supporting claws 18 are provided at the front and the rear sides of an intermediate portion of the first feeding pallet chamber $10_1$ so that the pallet supporting claws 18 are tiltable in the upwards direction against springs 18a to allow the lifting of the pallets $P_1$. In this way, when the fork lifter 14 is lowered by operating a switch and the like for feeding pallets $P_1$ into the pallet chamber $10_1$, those pallets $P_1$ remaining on the fork lifter 14 are supported by the pallet supporting claws 18, so that pallets $P_1$, can be fed into the pallet chamber $10_1$, any time even before the pallets $P_1$ that have previously been fed are used up.

Referring to FIG. 6, a conveying cart 19 has a pallet supporting plate 19b which is movable forwards and backwards via rails 19a equipped with rollers and normally clampable with a clamp 19c. After moving and setting the conveying cart 19 to an external portion of the first feeding pallet chamber $10_1$, the pallet supporting plate 19b is released from clamping with the clamp 19c and is fed onto the rails 16 with rollers inside the pallet chamber $10_1$. The pallets $P_1$, placed on the supporting plate 19b in a stacked condition are thus fed into the pallet chamber $10_1$. Here, the pair of fork portions 14d of the fork lifter 14 are lowered to a position below the rails 16 and, after feeding, the pallets $P_1$ are lifted from the supporting plate 19b. Then, the supporting plate 19b is pulled back to the conveying cart 19, thus completing the feeding work.

A discharging lifter $12_2$ provided in the first discharging pallet chamber $10_2$ has a construction similar to that of the above-mentioned feeding lifter $12_1$, and, therefore, the detailed explanation is omitted by giving the same numerals to the same elements as those of the feeding lifter $12_1$. However, the first discharging chamber $10_2$ is not provided with pallet supporting claws 18 because, unlike in the feeding chamber, this function is not needed in the discharging chamber.

The delivering lifters 15, 15 of the discharging lifter $12_2$ are operated such that the pallets $P_1$ which have become empty are lowered from the upper level of the first discharging pallet chamber $10_2$ so that they are stacked on the fork lifter 14. The conveying cart 19 is transferred to the pallet chamber $10_2$ after the work of feeding the pallets $P_1$ has been finished. After the supporting plate 19b has been sent onto the rails 16 with rollers in the pallet chamber $10_2$, the fork lifter 14 is lowered by a switch or the like in order to place the pallets $P_1$ on the lifter 14 onto the supporting plate 19b, and then the supporting plate 19b is pulled onto the conveying cart 19 in order to discharge the empty pallets $P_1$, out of the pallet chamber $10_2$.

Figure 5:
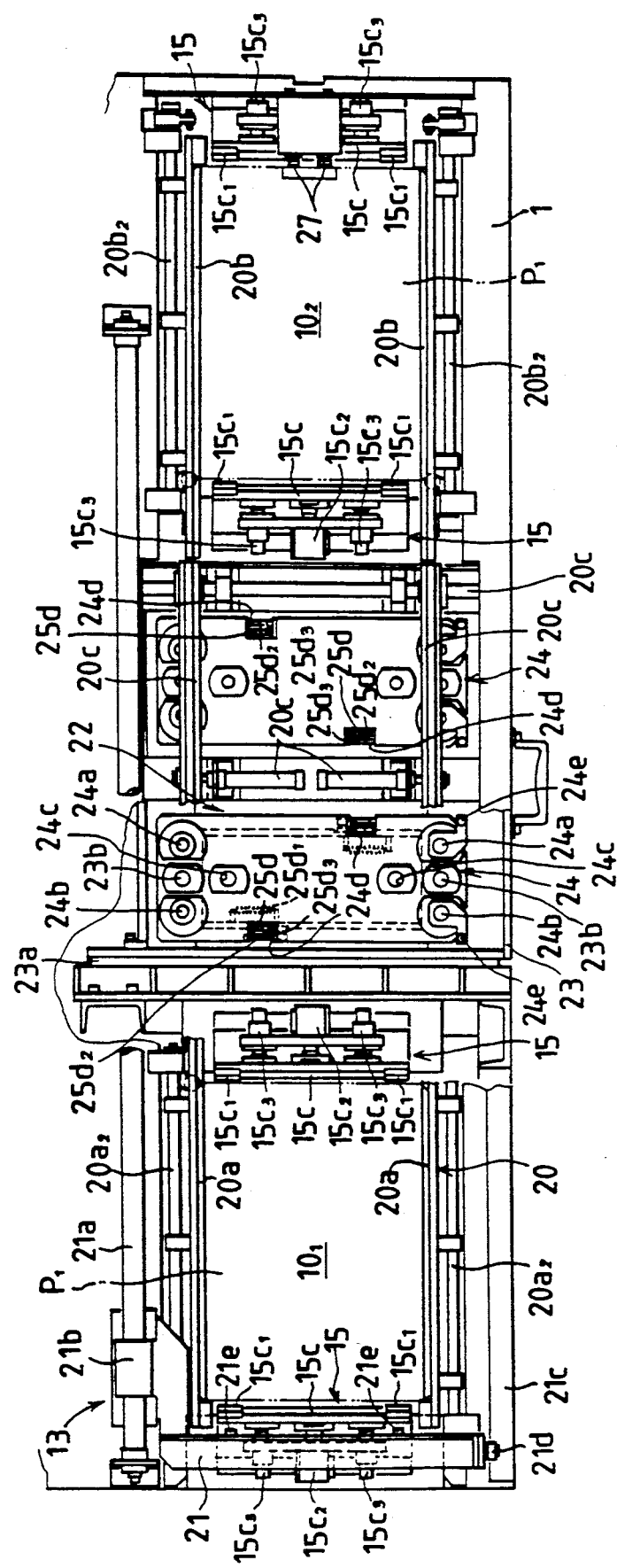
FIG. 5 is a plan view, partly in section, of the frame shown in FIG. 4.

The conveying unit 13 is constituted, as shown in FIGS. 5 and 6, by conveying rails 20 which extend over an upper position of the first feeding pallet chamber $10_1$, and an upper position of the first discharging pallet chamber $10_2$, and a push member 21 which pushes the pallets $P_1$ from the upper position of the first feeding pallet chamber $10_1$ towards the upper position of the first discharging pallet chamber $10_2$ with each pallet $P_1$ supported on the rails 20. The push member 21 is formed in a laterally extended shape, has one end connected to a slider 21b on the external periphery of a longitudinally elongated rodless cylinder 21a which is mounted along an intermediate portion of the frame 1 and has its other end supported on a roller 21d freely rotatable on a guide rail 21c along an upper external surface edge of the frame 1. The push member 21 has contact pieces 21e in an intermediate portion thereof which contact the rear edge of the pallet $P_1$ in a suspending manner so that the pallet $P_1$, can be pushed through the contact piece 21e by the forward movement of the push member 21 by the cylinder 21a.

Figure 8:
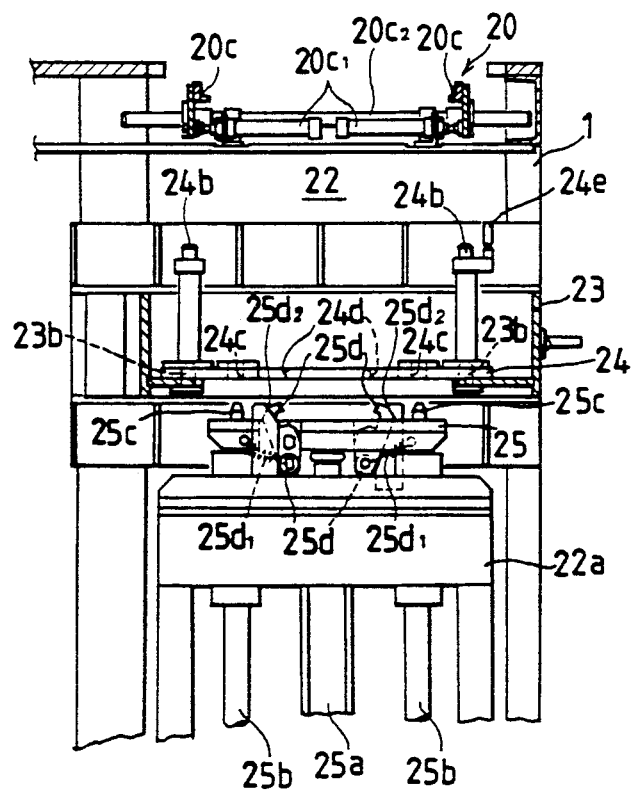

The rails 20 are constituted by a pair of right and left rear rails 20a, 20a which are positioned in an upper position of the first feeding pallet chamber $10_1$, a pair of right and left front rails 20b, 20b which are positioned in an upper position of the first discharging pallet chamber $10_2$, and a pair of intermediate right and left rails which are positioned in an upper position of a stock chamber 22 which lies between the pallet chambers $10_1$, $10_2$ and which is described in detail hereinafter. The front and the rear rails 20a, 20b are laterally swingable, as shown in FIGS. 4 and 6, by cylinders $20a_1$, $20b_1$, via shafts $20a_2$, $20b_2$ so that, in lifting the pallets $P_1$ from the first feeding pallet chamber $10_1$, and lowering the pallets $P_1$ to the first discharging pallet chamber $10_2$, the rails 20a, 20b can be swung laterally outwards to prevent the pallets $P_1$ from interfering with each of the rails 20a, 20b. The intermediate rails 20c, 20c are made to be laterally movable by each cylinder $20c_1$, along guide bars $20c_2$, as shown in FIGS. 5 and 8 so that the intermediate rails 20c, 20c can be moved laterally outwards when the assembling heads $5_1$, $5_2$ are changed.

The first pallet chambers $10_1$, $10_2$ are formed in the space under the main body of the frame 1 at a distance from each other in the longitudinal direction. The stock chamber 22 is formed in the intermediate portion between the first pallet chambers $10_1$, $10_2$ and contains a head magazine 23 in a freely insertable and withdrawable manner via front and rear withdrawing rails 23a, 23a. A pair of front and rear stock bases 24, 24 are provided in the head magazine 23 and are positioned by respective pins 23b. A pair of right and left first supporting poles 24a, 24a and a pair of right and left second supporting poles 24b, 24b are provided on each of the stock bases 24, 24 for supporting the first assembling head $5_1$ and for supporting the second assembling head $5_2$, respectively. A pair of front and rear lifting frames 25, 25 are provided on a support 22a which is provided under the magazine stock portion of the stock chamber 22. The lifting frames 25, 25 are lifted up and down guided by guide bars 25b via cylinders 25a. As shown in FIG. 8, a pair of right and left pins 25c, 25c are provided on each of the lifting frames 25, 25 so that those pins 25c, 25c are insertable into each of the right and left pin holes 24c, 24c in each of the stock bases 24. A pair of clamp pieces 25d, 25d mounted on the lifting frames 25, 25 are engageable with dented portions 24d, 24d in the front and the rear side edges of the stock base 24. Each of the clamp pieces 25d, 25d is always forced by springs 25d towards the closing direction and, at the same time, when the lifting frames 25 are lowered, each of the clamp pieces 25d is tilted by cams $25d_2$ on the support 22a towards the opening direction via follower members $25d_3$ at the lower ends thereof. When each of the lifting frames 25 rises, the pins 25c are engaged into the pin holes 24c and, at the same time, each of the clamp pieces 25d are engaged with the dented portions 24d in order to position each of the stock bases 24 to each of the lifting frames 25. Under this condition each of the stock bases 2 is made to be lifted from the head magazine 23. In connection with changing the kind of workpieces, the robot main body 8 of the above-mentioned robot apparatus 6 is moved to a position corresponding to an empty stock base 24 of the head magazine 23, and the stock base 24 is lifted by the lifting frame 25 which lies under the stock base 24. The first and the second assembling heads $5_1$, $5_2$ held in a suspended manner by the first and the second tool holders $9_1$, $9_2$ which are supported by the robot main body 8 in a suspended manner, are handed over to the first and the second supporting poles 24a, 24b of the stock base 24. Then, the stock base 24 is lowered and the robot main body 8 is moved to a position corresponding to the other stock base 24. The other stock base 24 is lifted by the lifting frame 25 which lies under the stock base and causes the first and the second assembling heads for the next kind of workpiece and which are supported by the first and the second supporting poles 24a, 24b and the second tool holders $9_1$, $9_2$, thereby performing the change in assembling heads.

In the figures, flag pins 24e for workpiece identification are mounted on each of the supporting poles 24a, 24b. Sensors 26 for workpiece identification work in cooperation with the flag pins 24e. The sensors 27 for identification of the kind of pallets are mounted at a front end portion of an upper position of the first discharging pallet chamber $10_2$.

In the lower space under the extended portion of the frame 1, second feeding and discharging pallet chambers $11_1$, $11_2$ are provided longitudinally in close proximity to each other. The conveying apparatus for the second-parts-containing pallets $P_2$ is the same as that for the first-parts-containing pallets $P_1$, as mentioned hereinabove except that intermediate rails 20c of the conveying rails 20 are missing. In FIGS. 2 and 3 the constituting members of the conveying apparatus for the second-parts-containing pallets $P_2$ are partly shown with the same numerals but affixed with dashes to the corresponding members of the conveying apparatus for the first-parts-containing pallets $P_1$.

As shown in FIGS. 1 through 3, a receiving unit 28 for the valve springs S is provided in the front end of the frame 1 such that it is movable between the parts-supplying position in the main body portion and the parts-receiving position in the extended portion. Further, a transfer apparatus 29 is provided on the frame 1 which transfers the springs S inside the second-parts-containing pallets $P_2$ positioned in the upper position of the second discharging pallet chamber $11_2$ to the receiving unit 28 which is positioned in a parts-receiving position. The transfer apparatus 29 is constituted by suspending a transfer head 31 equipped with holding members 31a for holding the springs S vertically movably by means of cylinders 31b and guide bars 31c, from a movable frame 30 which is moved in an upper space of the frame 1 by a motor 30a via ball threads (not shown) forwards and backwards in the longitudinal direction along a second guide frame 7a which is fixed to the guide frame 7. By the upward and downward movements of the transfer head 31 as well as by the forward and backward movements of the movable frame 30, valve springs S are picked up from a pallet $P_2$ which is positioned in the upper position of the second discharging pallet chamber $11_2$ to the receiving unit 28 which is positioned in the parts-receiving position in front of the upper position.

The second-parts-containing pallets $P_2$ are made such that the valve springs S can be contained in a plurality of lateral rows, each of the rows containing a plurality of valve springs S which are laterally arranged at a predetermined pitch. The above-mentioned holding members 31a are mounted on the transfer head 31 in a lateral row in a plurality of pieces at a pitch corresponding to the pitch of arrangement of the valve springs S so that the valve springs S can be picked up by one row at a time out of the pallet $P_2$. Though not illustrated, the receiving unit 28 is arranged so that a plurality of parts-bearing members are arranged in one lateral row and, by using a cam or the like, the pitch of arrangement of these parts-bearing members is freely changed over between the receiving pitch corresponding to the above-mentioned pitch and the pitch of arrangement of the valves, i.e., the pitch of arrangement of the holding member 5a of the assembling head $5_1$. In this manner, at the parts-receiving position, the valve springs S are handed over from each of the holding members 31a to each of the parts-bearing members with the parts-bearing members arranged at a pitch of receiving. When the receiving unit 28 is moved to the parts supplying position, the parts-bearing members are changed over to a pitch of supplying so that the valve springs S are handed over from each of the parts-bearing members to each of the holding members 5a. As a consequence, even if the pitch of arrangement of the valves V is changed due to the change in the kind of workpiece, the transfer head 31 need not be changed.

The first-parts-containing pallets $P_1$ are so arranged that the retainers R can be contained in a plurality of lateral rows, each row having a plurality of retainers R, and that one row of retainers R inside the pallet $P_1$, are picked up at a time by means of a plurality of holding members 5a.

Next, the assembling work procedures of the above described embodiment are explained. First, the robot main body 8 is moved backwards so that the first assembling head $5_1$ is moved to a position corresponding to a predetermined parts-containing row in a first-parts-containing pallet $P_1$, which is positioned in the upper position of the first discharging pallet chamber $10_2$. The first assembling head $5_1$ is lowered and, after it has received the retainers R in the parts-containing row in the pallet $P_1$, it is lifted up. Then, the robot main body 8 is moved forwards to a position corresponding to the receiving unit 28 which has been moved to, and is kept waiting at, the parts-supplying position. After the second assembling head $5_2$ is lowered and receives the valve springs S from the receiving unit 28, the second assembling head $5_2$ is lifted. The robot main body 8 is then moved forwards towards the jig base 2. The second assembling head $5_2$ is moved right above the valve guides G of the cylinder head W on the jig 4, and the second assembling head $5_2$ is lowered to assemble the valve springs S to the cylinder head W. Thereafter the head $5_2$ is lifted and the robot main body 8 is moved slightly so that the first assembling head $5_1$ is moved right above the valve guides G. The first assembling head $5_1$ is lowered to assemble the retainers R to the end of the valves V with the cotters C mounted to prevent the retainers R from being pulled out. Then, the first assembling head $5_1$ is lifted and the robot main body 8 is moved backwards towards the frame 1, thus completing one assembling work.

At the same time, when the robot main body 8 is moved forwards towards the jig base 2, the receiving unit 28 is moved to the parts-receiving position, and the valve springs S are transferred by the transfer apparatus 29 from the second-parts-containing pallet $P_2$ which is located in the upper position of the second discharging pallet chamber $11_2$. Then the receiving unit 28 is moved to the parts-supplying position so as to be ready for the next assembling work.

When the pallets $P_1$, $P_2$ which are located in the upper positions of the first and the second discharging pallet chambers $10_2$, $11_2$ have become empty, the pallets $P_1$, $P_2$ are lowered into the respective pallet chambers $10_2$, $11_2$ and, at the same time, next pallets $P_1$, $P_2$ are conveyed from the upper positions of the first and the second feeding pallet chambers $10_1$, $11_1$, to the above-mentioned upper positions so that the assembling work can be performed continuously.

As is clear from the foregoing explanation, according to the present invention as described, feeding and discharging pallet chambers are formed in a space under the frame on which the robot apparatus equipped with the assembling head is mounted, in order to utilize the space under the frame as a space for feeding the parts-containing pallets, thereby making it possible to construct the assembling apparatus compactly. Further, a stock chamber is formed in a space under the frame between the pallet chambers to make it possible to freely exchange the assembling heads between the head magazine disposed in the stock chamber and the robot apparatus. Therefore, the exchanging of the assembling heads can be efficiently performed in changing the kind of workpieces. Further, since the assembling heads can be exchanged without largely moving the robot apparatus backwards from the parts pickup position, the robot apparatus can be made smaller. Further, since the magazine is made to be freely insertable into and withdrawable from the stock chamber, it has an effect that it can cope with the changes in the kind of workpieces by changing the head magazines even though the stock chamber is limited in space.

Further, by extending the frame to the lateral direction and thus utilizing a space under the extended portion as the space for feeding the second-parts-containing pallets, it has an effect that as small an assembling apparatus as possible which can perform assembling of a plurality of parts, can be obtained.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

WHAT IS CLAIMED IS:

1. An automatic assembly apparatus comprising a frame, a robot apparatus on said frame, a tool holder supported at one of its ends on said robot apparatus, said tool holder having at its other end an assembling head removably attached to said other end, a first pallet chamber in one end of a space under said frame for receiving vertically stacked pallets with parts in each of said pallets for assembly on a workpiece, a second pallet chamber in an opposite end of said space under said frame for receiving pallets, one pallet after another, from said stacked pallets from said first chamber and for stacking said received pallets, one pallet on another, after said parts therein for assembly on said workpiece have been removed from said pallet, a stock chamber under said frame intermediate said first and second pallet chambers and having a magazine therein containing a plurality of assembling head for interchange with said assembling head removably attached to said other end of said tool holder, means for removing said assembling head attached to said other end of said tool holder and replacing said assembling head removed from said other end of said tool holder with an assembling head from said magazine, a jig base in front of said frame and in longitudinal alignment with said first and second pallet chambers and said stock chamber for positioning thereon workpieces to which said parts from said pallets stacked in said first pallet chamber are to be assembled, said robot apparatus having means for moving said assembling head in a longitudinal direction of said frame towards and away from said jig base and in a vertical direction of said frame for picking up parts from said pallets and assembling said picked-up parts in said workpiece positioned on said jig base;

said automatic assembly apparatus further comprising
a pallet conveying apparatus including means for lifting said pallets in said first pallet chamber to an upper position of said first pallet chamber, means for transporting an uppermost pallet from said upper position over said stock chamber to an upper position of said second pallet chamber, and means for lowering said uppermost pallet into said second pallet chamber.

2. An automatic assembly apparatus according to claim 1, further comprising means for freely inserting and withdrawing said head magazine into and out from said stock chamber.

3. An automatic assembly apparatus according to any of claims 1 or 3, wherein a second assembling head for assembling second parts is positioned on said robot apparatus side by side with said assembling head in a longitudinal direction;

said frame extending in a lateral direction and a pair of front and rear pallet chambers being formed in a space under said laterally extended frame for receiving stacked pallets containing said second parts in one of said front and rear pallet chambers and for stacking empty pallets in the other of said front and rear pallet chambers after said second parts have been removed;

said automatic assembly apparatus further comprising:

a second pallet conveying apparatus including means for lifting said second-parts-containing pallets in said one of said front and rear pallet chambers to an upper position in said one of said front and rear pallet chambers, means for transporting an uppermost pallet from said upper position to an upper position of the other of said front and rear pallet chambers, and means for lowering said uppermost pallet into said other of said front and rear pallet chambers;

a receiving unit in a front portion of said frame and movable between a parts-feeding position in front of said pickup position and a parts-receiving position at the lateral side thereof;

a transfer apparatus for transferring second parts placed in said second-parts-containing pallet positioned in said upper position of said front pallet chamber to said receiving unit which is positioned in said parts-receiving position; and wherein said second parts are received by said second assembling head in a condition in which said receiving unit has been moved to said parts-feeding position.

* * * * *